United States Patent [19]

Harper et al.

[11] 4,189,121

[45] Feb. 19, 1980

[54] VARIABLE TWIST LEADING EDGE FLAP

[75] Inventors: Philip M. Harper, Bellevue; Kirby W. Johnson, Brier, both of Wash.

[73] Assignee: Boeing Commercial Airplane Company, Seattle, Wash.

[21] Appl. No.: 871,561

[22] Filed: Jan. 23, 1978

[51] Int. Cl.² .............................................. B64C 3/54
[52] U.S. Cl. ................................................... 244/214
[58] Field of Search ................ 244/214, 219, 213, 210

[56] References Cited

U.S. PATENT DOCUMENTS

| | | | |
|---|---|---|---|
| 3,504,870 | 4/1970 | Cole et al. | 244/214 X |
| 3,638,886 | 2/1972 | Zimmer | 244/210 |
| 3,910,530 | 10/1975 | James et al. | 244/214 |

*Primary Examiner*—Barry L. Kelmachter

*Attorney, Agent, or Firm*—H. Gus Hartmann; Bernard A. Donahue

[57] ABSTRACT

A leading edge flap system for the tapered wing of an aircraft and more particularly, the spanwise flap segments and their linkage mechanism allow a relatively large leading edge bullnose member to be extended and unfolded out from a wing cavity. Each of the spanwise flap segments is supported from the leading edge of the wing by a pair of linkage mechanisms which are spaced apart spanwise and attached towards each spanwise end portion of the flap segment. The spanwise spaced apart linkage mechanisms are interconnected by a torque tube which is rotated through a fixed number of degrees by an actuator. By altering the geometry of the linkage mechanism, a differential motion is applied between the spanwise ends of the flap segment to torsionally twist the panel in a spanwise direction thereby varying the flap deflection angle spanwise.

6 Claims, 5 Drawing Figures

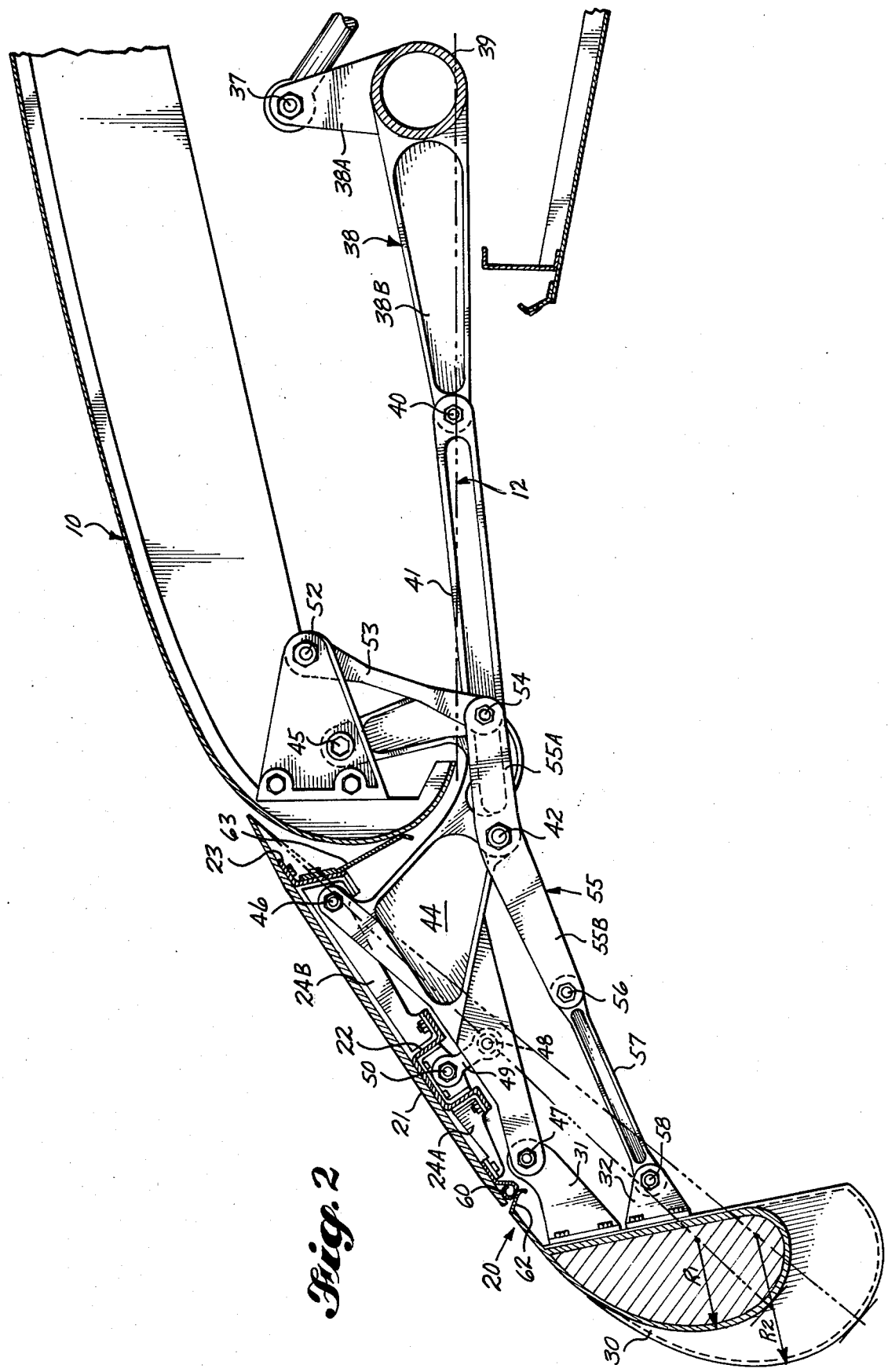

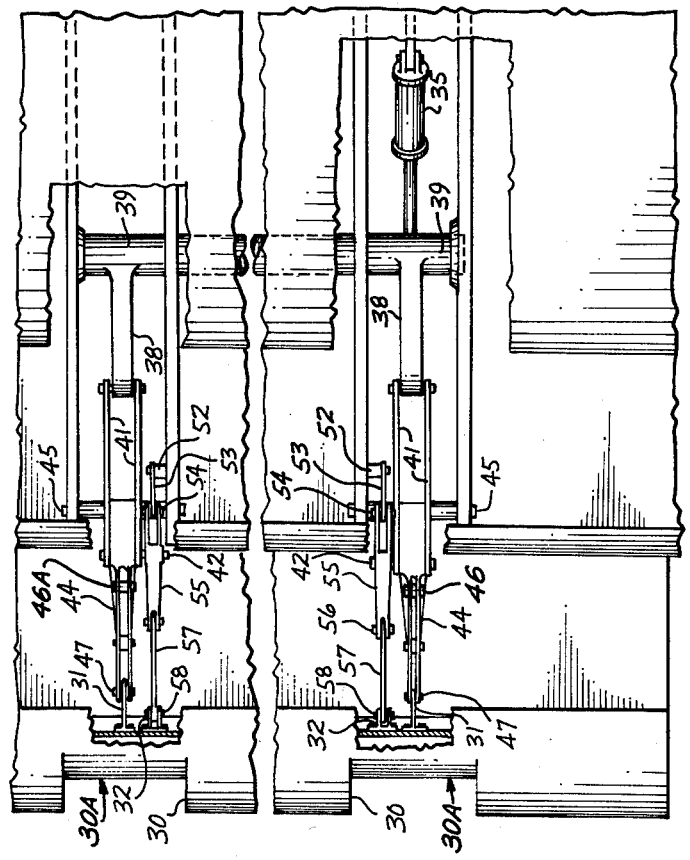
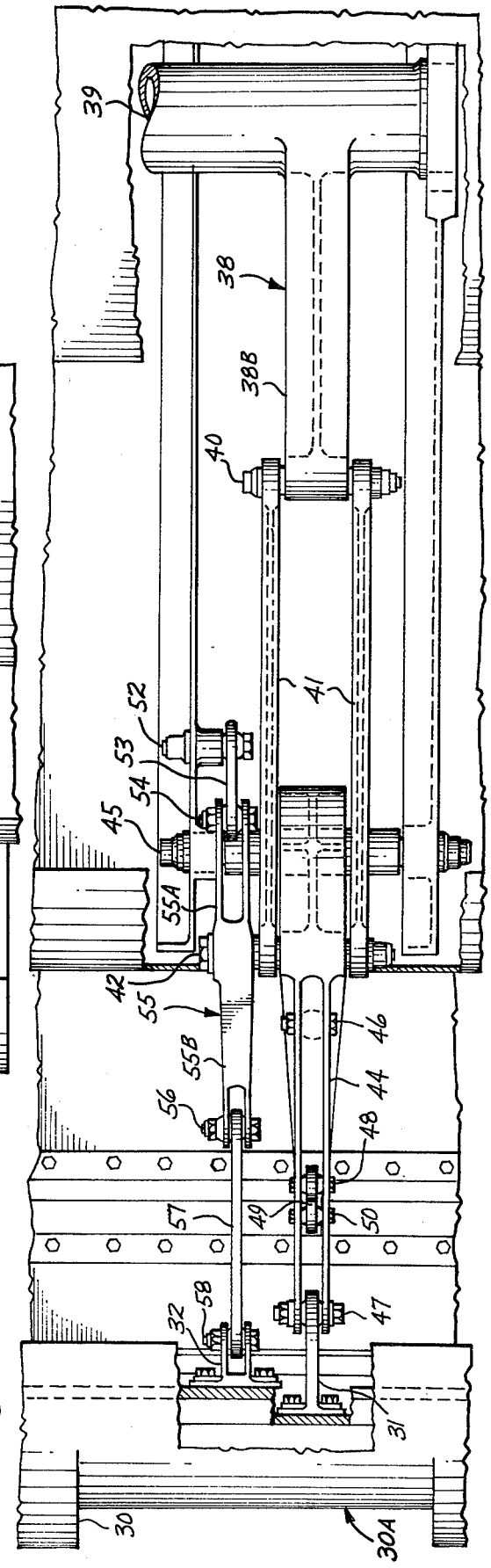

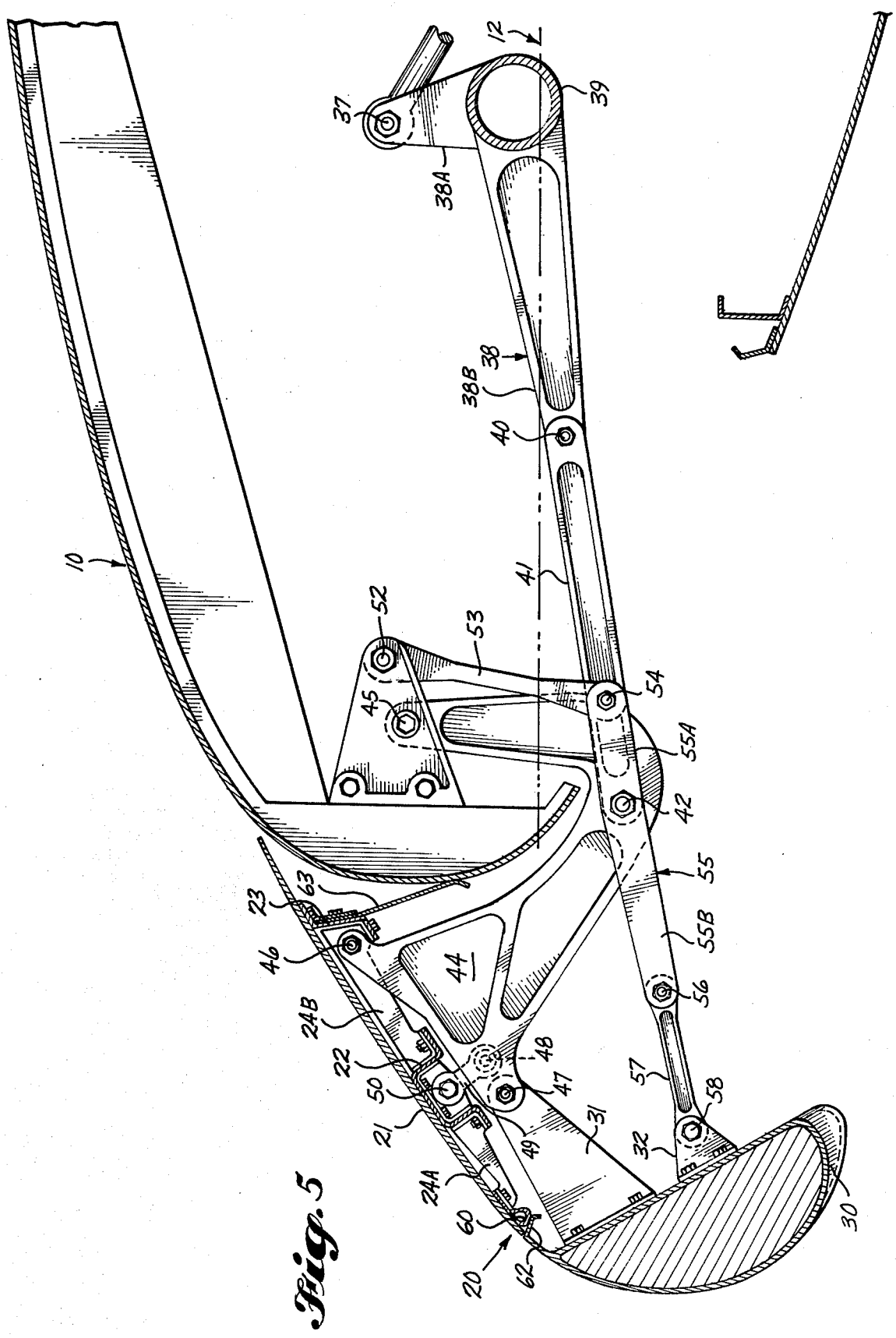

VARIABLE TWIST LEADING EDGE FLAP

SUMMARY OF THE INVENTION

Leading edge flaps are an attractive means of low speed stall protection on modern transport aircraft due to their simplicity and low weight. These devices generally rotate a portion of the leading edge lower surface, through a constant angle, about a fixed spanwise hinge line, to form an extension of the upper surface. The angle-of-incidence of the extended flap relative to the wing chord plane is a function of the lower surface contour and the constant angular rotation about the hinge line. Because contour varies with span, i.e., the more tapered and swept-back wing of today's modern jet transports is thicker inboard; therefore, if the leading edge lower surface forming the flap panel is rotated through a constant angle from its stowed position, the extended flap angle tends to decrease going inboard. This has a detrimental effect on today's highly swept-back wing airplanes, which would like to have the extended flap angle increase going outboard; thereby causing the stall to initiate on the inboard or root section of the wing and progress outboard therefrom, in order to create a stable pitch down post-stall condition. The present known state-of-the-art flap designs permit only one spanwise section to achieve an ideal angle-of-attack and all other points on the flap span are generally a compromise.

The present invention relates to a flap design which has the potential of providing an extended flap angle-of-attack which is independent of span; thereby providing the aerodynamicist with one more variable parameter to use in optimizing airplane performance. Outwardly, the present flap somewhat resembles current designs and comprises: a semi-rigid panel that forms the leading edge lower surface of the wing contour when it is in the retracted position; and a folding bullnose that also stows into the undersurface wing leading edge cavity. The independence of angle-of-attack of the extended flap from spanwise station, is achieved by twisting the flap panel during extension, and by varying the bullnose radius with span.

By twisting of the flap panel is meant that the chordwise contour remains unchanged but the angular rotation about the flap hinge point varies and is a function of spanwise location. The spanwise twisting of the flap panel can be controlled to achieve an aerodynamic flair of the panel and the upper surface of the wing; which is another way of saying that the angle-of-attack of the extended flap panel has been changed.

One of the objects of the present invention is to solve the problem of getting a spanwise flap segment, having quite a large leading edge bullnose member that is stowed in a folded position, out from the undersurface of a wing leading edge cavity. This requires a linkage mechanism which kinematically delays the unfolding motion of the bullnose member relative to the flap panel, during a substantial interval of the extension cycle in order that the bullnose member can clear the wing cavity during extension motion of the flap segment.

Another object is to produce a torsional twist, in a spanwise direction, into the extended flap segment; which twist, is in a direction generally opposite to that produced by the conventional flap extension mechanism.

Further, the object is not only to provide a linkage mechanism which produces a spanwise twisting motion into the flap panel which is opposite to that generally produced by conventional flap extension mechanisms, but also to vary in a spanwise direction, the angle-of-incidence of the flap chord plane relative to the wing chord plane such that the flap deflection angle decreases spanwise outboard and thereby decreases the overall effective aerodynamic camber of the combined flap and wing section.

Another object is to construct the flap panel of open sections, so the torsional stiffness in a spanwise direction is reduced, while retaining beam stiffness chordwise; thereby, permitting the panel to twist torsionally in a spanwise direction at a relatively low stress level.

Another object is to provide a failsafe feature in the event of the loss of fluid actuation pressure so that for all practical purposes, there is no actuating force required to hold the flap in the extended position due to the substantial alignment arrangement of a four bar linkage accomplished by inline tension links for maintaining the spanwise flap segment rigidly in the operative extended position by the air loads encountered during takeoff or landing operation of the aircraft.

A particularly advantageous application of this invention is in toward the root or inboard end of a tapered wing where the airfoil section is substantially thicker and the changing lower surface contour outboard thereof, creates the need for changing the flap panel extension angle. Also, the root end of a tapered wing has the larger cavity in the leading edge thereof; thereby allowing the stowage of a larger radius bullnose.

BRIEF DESCRIPTION OF THE DRAWINGS

FIG. 2 is a view similar to FIG. 1 with the leading edge flap extended to its forward operating position; whereat, the flap is aerodynamically air sealed with respect to the leading edge of the fixed wing structure.

FIG. 3 is a bottom plan view of the flap linkage mechanism shown in FIG. 2 and shows the offset drive means for the folding bullnose member.

FIG. 4 is a bottom plan view similar to that of FIG. 3, except that it includes the additional showing of a second flap linkage mechanism with an interconnecting torque tube, arranged with respect to a complete spanwise flap segment.

FIG. 5 is a chordwise cross-sectional view of a leading edge wing flap segment which is extended to its forward operating position, similar to that shown in FIG. 2, except that the flap section is taken at a wing span station which is further inboard than that shown in FIGS. 1-4; and whereat, the wing section is larger and thicker, the relative chordlength of the flap section is reduced, and the bullnose member is relatively larger and much blunter, than the flap section shown in FIG. 2.

DESCRIPTION OF THE PREFERRED EMBODIMENTS

Figure 1:
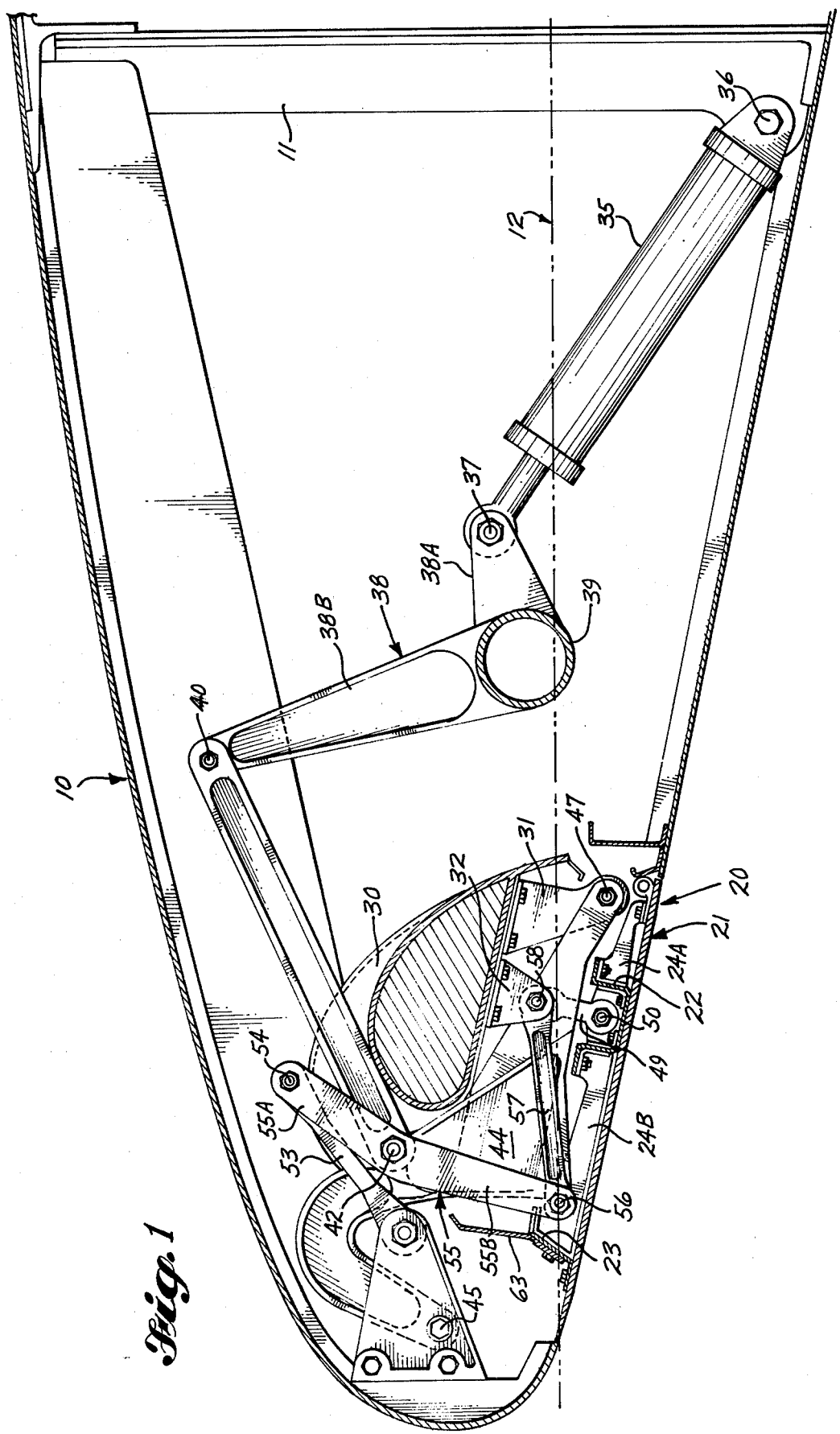
FIG. 1 is a chordwise cross-sectional view of the leading edge wing flap in the stowed position; whereat, it completes the undersurface contour of the fixed wing airfoil section.

FIG. 1 is a chordwise cross-sectional view of a wing leading edge flap segment in its fully retracted position where it is stowed within the airfoil section envelope of the fixed wing section 10. The flap segment comprises:

a relatively flap panel 21 which forms the undersurface closure and completes the contour of the fixed wing airfoil section; and a folded leading edge bullnose structure 30 housed within the wing airfoil envelope.

FIG. 2 is also a chordwise cross-sectional view similar to FIG. 1 and shows the flap segment extended to its forward operating position.

Referring to FIG. 2, the flap segment mechanism can be broken down into certain basic categories: (1) flap segment structural support; (2) the driving linkage and actuating mechanism; (3) bullnose folding linkage; (4) an inline tension linkage arrangement of the flap driving linkage; and (5) an inline tension linkage arrangement of the bullnose folding linkage.

The flap segment structural support comprises, a flap chord gooseneck link 44 having its gooseneck portion pivotally supported at 45 by fixed wing structure. The swinging portion of gooseneck link 44 is attached at 46 through a mono-ball connection to the aft portion of the flap panel 21 and also through a mono-ball link 49 and pin connections 49 and 48, to the forward portion of the flap panel 21. The outer swinging end of the flap chord gooseneck link 44 pivotally supports at 47, the flap leading edge bullnose structure 30 through an arm 31 structurally integral therewith.

The driving linkage and actuating mechanism comprises, a linear actuator 35, a driving bellcrank 38, and push rod 41. The linear actuator 35 has its lower aft end pivotally attached at 36 of the front wing spar 11 and has at its upper forward end the actuator rod connected at 37 to an arm 38A of the driving bellcrank 38. The driving bellcrank 38 is fixedly pivoted at 39 to fixed wing structure and has another arm 38B pivotally connected at 40 to the push rod 41.

The driving linkage and actuating mechanism comprising: the linear actuator 35, the driving bellcrank 38, and the push rod 41; also incorporates a first deadcenter linkage arrangement to maintain the rigidity of the extended flap panel 21 due to the air loads encountered during takeoff or landing. This first deadcenter arrangement occurs at the juncture 40 of the driving bellcrank arm 38B and the push rod 41.

The bullnose folding and unfolding linkage comprises, a radius rod 53, a bellcrank 55, and a pushrod 57. The radius rod 53 has its upper end connected through a fixed pivot 52 to wing structure and its lower end pivot connected at 54 to an arm 55A of bellcrank 55. The bellcrank 55 is supportably mounted at pivot 42 for rotation on the flap chord gooseneck link 44; and the bellcrank arm 55B is pivot connected at 56 to the upper aft end of pushrod 57. The lower forward end of pushrod 57 is pivot connected at 58 to the flap leading edge bullnose structure 30 through a bracket 32 integral therewith.

The delayed unfolding motion of the bullnose member 30 relative to the flap panel 21, is achieved through the programmed movement of the bellcrank arm 55B about its pivot 42 which is on the gooseneck link 44. The rotational movement of bellcrank arm 55B relative to the gooseneck link 44 is controlled by the geometric linkage mechanism comprising, the bellcrank arm 55A; the radius rod 53, and the judicious location of the radius rod pivot point 52 onto fixed structure. This geometric linkage mechanism, of radius rod 53 and bellcrank arm 55A, programs the unfolding motion of the bullnose 30 relative to the flap panel 21, such that it remains substantially folded during the initial portion of the extension cycle of the spanwise flap segment 20, until the bullnose 30 is out of the wing cavity and free or clear of fixed wing structure.

The bullnose folding and unfolding linkage, also incorporates a second deadcenter linkage arrangement for maintaining rigidity between the flap chord gooseneck link 44, which supports the flap panel 21, and the flap leading edge bullnose structure 30. This second deadcenter linkage arrangement occurs at the juncture 56 of the bellcrank arm 55B and the push rod 57.

FIG. 3 is a bottom plan view of the flap linkage mechanism shown in FIG. 2 and shows that: the main torque tube crank 39; the main push rod 41 and its connection at 42 to the gooseneck link 44; and the support connection 47 for the bullnose 30; as being all in the same chordwise plane. In other words, the flap segment support and driving linkage mechanisms, are a first planar mechanism.

Off to one side of this first planar mechanism, is a second planar mechanism comprising: the bullnose folding and unfolding linkage mechanism. Thereby, making the combined flap linkage mechanism an unsymmetrical linkage arrangement. One reason that this was done was for the purpose of saving parts; and a stress analysis of this unsymmetrical linkage arrangement has indicated its feasibility. FIG. 4 is a bottom plan view similar to FIG. 3, except that it includes the showing of a complete flap segment with the arrangement of the dual sets of flap extension and retraction linkage mechanisms and their interconnecting main torque tube 39. The torque tube is rotatably driven by only one linear actuator 35 per spanwise flap segment.

With only one linear actuator per spanwise flap segment, the output motion thereof imparts a fixed angle of rotation or a given number of degrees of rotation to the torque tube which interconnects the spanwise spaced apart flap linkage mechanisms at either end of the flap segment. Therefore, the manner that the differential motion is applied between the spanwise ends of the flap segment, is by altering the geometry of the chordwise linkage mechanisms.

As shown in FIG. 4, the leading edge surface of the flap segment has a spanwise series of indentations or notches 30A which appear in the sectional side views of FIGS. 1-2 as a double bullnose cross-section which could be slightly misleading. The notch 30A in the bullnose member 30 is there because otherwise there would be an interference between the linkage and the bullnose during retraction from the position of the flap shown in FIG. 2 to the stowed position shown in FIG. 1.

Referring to FIG. 2, by controlling the bullnose radius, as indirectly illustrated by the leading edge 30 and bullnose radius $R_2$ and the indentation 30A and the bullnose radius $R_1$, and fairing into the upper surface of the panel, the angle-of-attack can be made further independent of spanwise location and flap panel extension angle. In comparing $R_1$ and $R_2$, it will be noted that a relatively large bullnose, for a given flap extension angle, will increase the flap angle-of-incidence relative to the wing chord plane.

FIG. 5 is a side cross-sectional view of a flap segment taken at a wing span station that is further inboard on a tapered wing than that shown in FIGS. 3-4, whereat the wing section is thicker and the chord of the flap segment is reduced relative thereto; also, the bullnose member is much larger and blunter.

In FIG. 5 where the elements are somewhat similar in function and arrangement than those shown in FIGS. 1-4, they have been given like numerals.

By comparing the inboard flap section shown in FIG. 5 with the relative outboard flap section shown in FIGS. 1-4 it will be seen how the various elements making up the flap system of the present invention are modified to produce a full span leading edge flap system for the tapered wing of an aircraft. The comparison shows how the flap chord section varies from one spanwise wing station to another; and in particular, how the deflection angle of the flap-chord line or angle-of-incidence of the flap-chord relative to the wing-chord plane, changes.

One thing which really isn't obvious from the figures, is what is done to the flap segment in a spanwise sense. Aerodynamically, the wing leading edge configuration at a spanwise inboard location on the wing, required a flap panel with a relatively large radius bullnose; and further, it was required that the chordal cross-section of the flap segment be variable in a spanwise direction with respect to both its chord-width and its angle-of-incidence relative to the wing-chord plane, i.e., that the outboard end of the spanwise flap segment be of lessor chord width and at a steeper angle-of-incidence than at the inboard end thereof. Yet, all of this had to be stowed back into the wing leading edge cavity where the undersurface contour of the fixed wing airfoil section was such at the inboard and outboard ends of the flap segment, the undersurface wing contour was just relatively opposite to the type of spanwise twist or spanwise change in angle-of-incidence of the flap segment that was desired; thereby requiring that the flap extension linkage mechanism at the inboard portion of the flap segment, rotate the flap through a different number of degrees than at the outboard location thereof.

In the conventional known type of Kruger flap extension mechanism, the particular twist of the flap panel that occurs spanwise, relative to the undersurface contour of the fixed wing airfoil section, is just carried forward to become the same spanwise twist that exists when the device is extended. In other words, about the flap extension-retraction rotation point, the angle of extension that occurs is the same everywhere spanwise along the flap segment. However, in the present invention this spanwise twisting of the flap segment is made to occur in a direction opposite to that of convention flap extension mechanisms.

A different amount of output motion can be accomplished between the linkage mechanisms at either end of the flap segment by varying the length of one of the arms of the driving bellcrank 38; and also, by varying the length of the push rod 41 and its connecting point 42 to the gooseneck member 44. This will produce a difference in the number of degrees of rotation of the flap chord-section about the hinge point 45 of the gooseneck member 44. Further, it is important for a spanwise flap segment which varies in chordwidth, and during extension twists spanwise in a direction opposite to that dictated by the undersurface contour of the wing, that the kinematic motion of the two linkage mechanisms at either end of the flap segment be synchronized or keyed to one another so that they function as a family of motions, i.e., it is not desirable to have a greater angular acceleration at one end of the flap panel during the initial period of the angular extension motion and then at the other end of the flap panel have a greater rate of angular acceleration towards the termination period of the flap extension motion. Both of the flap linkage mechanisms, at each end of the panel, have to be accelerating and decelerating uniformly, i.e., substantially at the same time and at substantially the same rate in order to minimize imparting any distortional stress to the panel. That is the reason for there being only a single drive input connection to the bullnose member from each set of spanwise spaced linkage mechanisms, at each end of the flap panel. Because, if there were a dual parallel and symmetrical drive linkage connection at each end of the flap panel there would be a paired drived input; and in essence, the bullnose member would be driven through four spanwise spaced drive connecting points as opposed to the desired two; thereby preventing a spanwise twisting motion of the flap panel during extension. The flap segment, when in its stowed position, has a spanwise torsional twist in one direction for matching the undersurface contour of the fixed wing airfoil section, and has a torsional twist in the opposite direction when it is in the extended position. This is as a result of the difference in the angle of rotation of the flap chord line at either end of the spanwise flap segment. The chord plane of the flap segment is continuously twisting spanwise during extension and retraction; and a somewhat similar action is imparted to the bullnose member during the folding and unfolding motion thereof. However, while it is desirable that the flap panel be twisted during extension, it is not desirable that the bullnose member itself be twisted. Therefore, one of the objects in the design of the linkage mechanism, is to get the folding and unfolding rotation of the bullnose member relative to the flap panel, to be the same throughout its length, from its stowed position to its extended position. Kinematically, the problem is solved so that the bullnose member has the same twisted relaxed shape when it is in its stowed position as when it is in its extended position. However, due to the geometry of the derived linkage mechanism, a slight amount of torsional force is applied to the bullnose member in transit through the mid-range position and then this torsional force is relaxed upon further movement towards the extended position. A study of the kinematic motion of the linkage mechanism has indicated that the amount of the torsional force applied to the bullnose member is small enough so that no special structural beef-up modifications are necessary; thereby, allowing the bullnose to be constructed as a torsionally stiff closed section.

Preferably, the input motion from the spanwise spaced sets of linkage mechanisms, for unfolding the bullnose member, is directed through two, spanwise spaced, single, connecting points; because, if the input motion is through a dual connection at each of the spanwise spaced sets of linkage mechanisms, then just a slight variation in the kinematic extension movement between the sets of linkage mechanisms at each end of the flap segment, could put a shear force in both the panel and the bullnose member, e.g., if a length of panel is supported at its ends by two pin joints, and one of the pin joints is moved relative to the other, all that occurs is that one end of the panel is displaced. However, if there were paired or dual joints at each end of the panel and one of the dual joints was moved relative to the other, then a shear force would be introduced into the panel. Therefore, in order to avoid such shear force loading of the flap panel and bullnose member, an unsymmetrical linkage arrangement, as shown in the plan views of FIGS. 3 and 4, is utilized for the folding and unfolding drive input to the bullnose member.

Preferably, the flap panel is constructed of a laminated glass fabric composite sheet and is structurally supported by two spanwise stringers, a hat section stringer 22 forward and a Z-section stringer 23 aft; and chordwise stiffeners 24A and 24B. The stringers 22 and 23 are open sections so that they do not have a great deal of torsional rigidity. The flap panel is designed structurally so that it has strength as a beam member to carry the airloads in chordwise bending, but with less strength as a torsional member in order to give it the freedom to twist in a spanwise direction during its extension and retraction operating cycle. It is not necessary that the panel flex or bend during retraction to the stowed position for conforming to the undersurface contour of the wing airfoil section; nor, it is desirable that the panel flex or change in camber chordwise when extended to its forward operating position, except to the extent necessary for torsionally twisting in a spanwise direction to vary the flap deflection angle, which panel flexing effect would be very little.

When the linkage mechanism, at either end of a flap segment, extends the flap segment, it imparts a torsional twist thereto and produces a slight change in the overall length of the panel and in the distance between the connecting points of the panel to linkage mechanism. However, the motion of the linkage mechanism remains primarily in a chordwise plane and the links do not move out of this plane of motion to accommodate the change in spanwise distance between the connecting points of the flap segment of actuating linkage due to the spanwise twisting motion of the flap panel. This is taken care of by putting lug and clevis joint at one end of the flap panel, at the aft connecting point of the flap panel to gooseneck link attachment, wherein, the clevis will permit freedom for the lug to drift so as to permit a sidewise movement connection.

At the forward connecting points of the flap panel to the gooseneck links 44, the manner that the out-of-plane motion of the spanwise twisting flap panel is handled, is through a mono-ball type interconnecting link 49, i.e., a short link having a ball joint a either end.

The panel at this forward connecting point in essence floats off of the mono-balled link 49; therefore, aerodynamic loads, acting in the chordwise plane of the panel, are taken out by the aft connecting points 46 of the flap panel to gooseneck links. Air loads acting normal to the panel, i.e., lift or up-and-down airloads, are taken through both the fore and aft connecting points 50, 46 of the flap panel to gooseneck links. As far as any side-load or spanwise load on the panel, this is taken out at one end of the panel through a clamped up clevis and mono-ball 46 on the flap support arm or gooseneck member 44 and this connection does not have side play in it. The opposite end of the flap panel does however have a sliding clevis mono-ball connection 46A for side play.

A flap panel was built and tested by cycling it for the estimated fatigue life of the airplane, with good resutls. Further, through photo-stress analysis of the flap panel, wherein a plastic coating is put onto the panel and the panel is then cycled in a simulated use manner, and if there are any highly stressed areas on the panel they show up as colors in the plastic coating, the photographs did not reveal any colors which indicated that the panel would be subject to failure due to cyclic stresses.

The flap system of the present invention is an aerodynamically air sealed, wing leading edge, high lift device as opposed to an aerodynamically slotted flap arrangement. With respect to air seal means between the folding bullnose 30 and the flap panel 21 with the flap segment 20 in the extended operating position, as shown in FIG. 2, at the forward edge of the flap panel a bulb type seal 60 is fixedly fastened thereto and on the aft edge of the bullnose member 30 is fixedly fastened, a seal depressor 61; and when the flap segment is retracted to the stowed position, the same bulb seal 60 is depressed by a seal depressor 62 fixedly attached to fixed wing structure to form an air seal. With respect to air seal means between the aft end of the extended flap segment and the leading edge of the fixed wing, a blade type seal 63 interacts therebetween.

What is claimed is:

1. A retractable variable twist leading edge flap for a spanwise tapered airfoil, comprising: a spanwise flap segment having a semi-rigid flap panel and a bullnose leading edge; a pair of flap linkage mechanisms spaced apart spanwise and attached to the spanwise flap segment at an inboard and outboard end portion thereof for supporting said flap segment in a forward and downward extending operative position from the leading edge portion of the airfoil; each flap linkage mechanism having a flap support arm pivoted to the leading edge portion of the airfoil for rotation in a chordwise plane; said flap panel being articulated to the flap support arm for permitting the panel to torsionally twist in a spanwise direction, independently of the flap support arm, during both the extension and the retraction cycle of flap segment operation; said bullnose leading edge being rotatably supported directly from the swinging end of the flap support arm; means for separately sequencing rotation of the bullnose leading edge relative to the flap panel during rotation of the flap support arm, such that an unfolding rotation of the bullnose leading edge with respect to the flap panel is delayed during deployment of the spanwise flap segment to said operative position; and means for interconnectably rotating a drive arm of each set of flap linkage mechanisms of the flap segment, to torsionally twist the semi-rigid flap panel spanwise during extension from a first spanwise torsional twist in one direction when the flap segment is in a stowed position to match the undersurface contour of the airfoil, to a second spanwise torsional twist in the opposite direction when the flap segment is in the extended operative position.

2. The leading edge flap as set forth in claim 1, wherein the means for separately sequencing rotation of the bullnose leading edge relative to the flap panel, comprises: a bellcrank supportably mounted on the flap support arm; an interconnecting link pivotally connected at one end to a first arm of the bellcrank and pivotally connected at its other end to the bullnose leading edge; and a radius link pivoted to airfoil structure aft of a flap support arm pivot and the swinging end thereof being pivotally connected to a second arm of the bellcrank, and said first arm of the bellcrank and said interconnecting link being substantially in dead-center linkage alignment when the flap segment is in the forward operating position for maintaining rigidity between the bullnose leading edge and the flap panel during normal aerodynamic lifting airfloads on the flap segment.

3. A spanwise segmented leading edge flap span for a tapered wing having a spanwise flap segment comprising: a semi-rigid flap panel, which is constructed so that torsional stiffness in a spanwise direction is reduced while retaining beam stiffness in a chordwise direction for permitting the flap panel to twist spanwise at a relatively low stress level; a rounded leading edge flap section having a torsionally rigid bullnose structure, which is foldable relative to the flap panel; two sets of spanwise spaced apart flap extension linkage mechanisms attached to an inboard and an outboard portion of the flap segment, and interconnecting the flap segment with the leading edge portion of the wing for support in a forward and downward extending operative position whereat an aerodynamically airsealed engagement is formed between the trailing edge portion of the flap segment and the leading edge portion of the wing; a torque tube interconnecting the two sets of flap linkage mechanisms on the flap segment; each flap linkage mechanism set having a flap support arm pivoted to fixed leading edge structure of the wing for rotation in a chordwise plane; said flap panel being articulated to the flap support arm of each flap linkage mechanism set for permitting a torsional twisting of the flap panel in a spanwise direction relative to each of the flap support arms during both the extension and the retraction cycle of flap segment operation; said bullnose structure being pivotally connected directly from the swinging end of each of the flap support arms; means for rotatably folding the bullnose structure relative to the flap panel during retraction cycle rotation of each of the flap support arms; each flap linkage mechanism set having a drive arm spaced chordwise aft of the flap support arm and fixedly pivoted to the wing structure; each flap linkage mechanism set having a drive link interconnecting the swinging end of the drive arm with the flap support arm; said torque tube being interconnected to the drive arm of each flap linkage mechanism set on the flap segment; and actuating means for simultaneously rotating the drive arms through a fixed angle during both the extension and the retraction cycle of flap span operation.

4. The leading edge flap as set forth in claim 3, wherein the means of each flap linkage mechanism set for rotatably folding the bullnose structure relative to the flap panel, comprises: a bellcrank supportably mounted on the flap support arm at a pivotal connection common with the drive link; an interconnecting link pivotally connected at one end to a first arm of the bellcrank and pivotally connected at its other end to the bullnose structure; and a radius link pivoted to airfoil structure aft of a flap support arm pivot and the swinging end thereof being pivotally connected to a second arm of the bellcrank.

5. The leading edge flap as set forth in claim 4, comprising: a first dead-center linkage alignment between the first arm of the bellcrank and the interconnecting link; a second dead-center linkage alignment between the drive arm and the drive link; whereby, the normal aerodynamic lifting airloads on the flap segment when in the forward operating position, do not impose a power requirement on the actuating means for maintaining flap rigidity.

6. A leading edge flap for a tapered wing as set forth in claim 3, wherein, said two sets of spanwise spaced apart flap extension linkage mechanisms which are attached to an inboard and an outboard portion of a flap segment, have slight geometric and kinematic differences between them such that they conjointly produce a spanwise change in the angle-of-incidence of the flap chord section.

* * * * *